United States Patent
Feeser et al.

(10) Patent No.: US 10,471,926 B2
(45) Date of Patent: Nov. 12, 2019

(54) VEHICLE FRONT STRUCTURE

(71) Applicant: Dr. Ing. h.c. F. Porsche Aktiengesellschaft, Stuttgart (DE)

(72) Inventors: Klaus Feeser, Vaihingen/Enz (DE); Tobias Hegedusch, Schwieberdingen (DE); James Horn, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/813,537

(22) Filed: Nov. 15, 2017

(65) Prior Publication Data

US 2018/0141515 A1 May 24, 2018

(30) Foreign Application Priority Data

Nov. 21, 2016 (DE) .................. 10 2016 122 288

(51) Int. Cl.
*B60R 21/34* (2011.01)
*B60R 19/26* (2006.01)
*B60R 19/48* (2006.01)
*B60R 21/0136* (2006.01)
*B60R 21/00* (2006.01)
*B60R 19/18* (2006.01)

(52) U.S. Cl.
CPC .............. *B60R 21/34* (2013.01); *B60R 19/26* (2013.01); *B60R 19/483* (2013.01); *B60R 21/0136* (2013.01); *B60R 2019/186* (2013.01); *B60R 2021/0004* (2013.01); *B60R 2021/343* (2013.01)

(58) Field of Classification Search
CPC ............. B60R 21/34; B60R 21/0136; B60R 2021/0004; B60R 2021/343; B60R 19/26; B60R 19/483; B60R 2019/186
See application file for complete search history.

(56) References Cited

U.S. PATENT DOCUMENTS

| | | | |
|---|---|---|---|
| 2001/0028163 A1* | 10/2001 | Breed ...................... | B60J 10/00 280/735 |
| 2006/0272391 A1* | 12/2006 | Tsukamoto ......... | B60R 21/0136 73/12.09 |
| 2008/0201077 A1* | 8/2008 | Tanabe ................ | B60R 21/0136 701/301 |

(Continued)

FOREIGN PATENT DOCUMENTS

| DE | 10 2014 008 816 | 12/2014 |
|---|---|---|
| DE | 10 2013 016 239 | 4/2015 |

(Continued)

OTHER PUBLICATIONS

German Search Report dated Aug. 7, 2017.

*Primary Examiner* — Gregory A Blankenship
(74) *Attorney, Agent, or Firm* — Gerald E. Hespos; Michael J. Porco; Matthew T. Hespos (57) ABSTRACT

A vehicle front structure (1) for a motor vehicle with a safety system (2) having a pressure tube (3) for detecting a pedestrian impact on a front region (11) of the motor vehicle, and with a cross member (4) extending transversely with respect to a longitudinal direction of the motor vehicle. The pressure tube (3) is arranged above the cross member (4), and therefore the pedestrian impact is detectable in a load plane (5) above a load plane (15) defined by the cross member (4).

8 Claims, 5 Drawing Sheets (56) References Cited

U.S. PATENT DOCUMENTS

| | | | | |
|---|---|---|---|---|
| 2008/0315598 | A1* | 12/2008 | Takafuji | B60R 19/483 |
| | | | | 293/117 |
| 2009/0021030 | A1* | 1/2009 | Tanabe | B60R 21/0136 |
| | | | | 293/117 |
| 2009/0050395 | A1* | 2/2009 | Hosokawa | B60R 21/0136 |
| | | | | 180/274 |
| 2009/0322107 | A1* | 12/2009 | Takahashi | B60R 21/0136 |
| | | | | 293/121 |
| 2010/0038922 | A1* | 2/2010 | Takahashi | B60R 19/483 |
| | | | | 293/117 |
| 2013/0013156 | A1* | 1/2013 | Watanabe | B60R 21/0136 |
| | | | | 701/45 |
| 2014/0265445 | A1* | 9/2014 | Leach | B60R 19/483 |
| | | | | 296/187.04 |
| 2015/0274119 | A1* | 10/2015 | Schondorf | B60R 19/483 |
| | | | | 293/132 |
| 2016/0039376 | A1* | 2/2016 | Narita | B60R 19/483 |
| | | | | 293/4 |
| 2016/0280166 | A1* | 9/2016 | Ikarugi | B60R 19/18 |
| 2016/0347270 | A1* | 12/2016 | Higashimachi | B60R 19/04 |
| 2017/0225637 | A1* | 8/2017 | Kamimura | B60R 19/18 |
| 2018/0141515 | A1* | 5/2018 | Feeser | B60R 19/483 |

FOREIGN PATENT DOCUMENTS

| | | | | |
|---|---|---|---|---|
| DE | 10 2015 224 443 | | 6/2016 | |
| EP | 2 678 191 | | 1/2014 | |
| EP | 2868533 | * | 6/2015 | B60R 21/34 |
| WO | WO 2016/083291 | * | 6/2016 | B60R 19/483 |

* cited by examiner

VEHICLE FRONT STRUCTURE

CROSS REFERENCE TO RELATED APPLICATION

This application claims priority under 35 USC 119 to German Patent Appl. No. 10 2016 122 288.7 filed on Nov. 21, 2016, the entire disclosure of which is incorporated herein by reference.

BACKGROUND

Field of the Invention

The invention relates to a vehicle front structure for a motor vehicle, with a safety system having at least one pressure tube for detecting a pedestrian impact on a front region of the motor vehicle.

Description of the Related Art

Motor vehicles ever more frequently are provided with pedestrian protection to reduce the risk of injury to pedestrians in the event of a collision. For this purpose, the impact event generally has to be sensed in as targeted a manner as possible to initiate the corresponding measures for pedestrian protection simultaneously or subsequently. For example, the front hood may be raised to better absorb the energy of the impact.

EP 2 678 191 B1 describes pedestrian protection in which the impact is sensed by a deformable tube and a pressure sensor connected thereto. The pressure tube is positioned in the direction of travel in front of a cross member as counterbearing.

By contrast, it is the object of the present invention to permit improved pedestrian protection for motor vehicles that further reduces the risk of injury to children. In particular, as short a sensing time of the impact as possible, preferably less than 10 ms, is intended to be possible. The intention preferably is to permit pedestrian protection that delivers improved results in a test with the test specimen PDI-2 (Pedestrian Detection Impactor-2) or comparable test specimens.

SUMMARY

The vehicle front structure according to the invention is provided for a motor vehicle and preferably for a passenger vehicle. The vehicle front structure comprises a safety system with at least one pressure tube for detecting a pedestrian impact on a front region of the motor vehicle. The vehicle front structure comprises at least one cross member extending transversely with respect to a longitudinal direction of the motor vehicle. The cross member may be a bumper cross member. In this case, the pressure tube is arranged above the cross member, and therefore the pedestrian impact is detectable in a load plane above a load plane defined by the cross member.

The vehicle front structure according to the invention has many advantages. A considerable advantage is that the pressure tube is arranged above the cross member and therefore a pedestrian impact in an upper load plane can be detected significantly better. The upper load plane is particularly crucial in the identification of a collision with children of preschool age. The invention can therefore considerably reduce the risk of injury to children since children generally have a first contact in the upper load region.

Such collisions are simulated, for example, with the test specimen PDI-2 or comparable test specimens. By arranging the pressure tube in the upper load plane, the vehicle front structure of the invention affords highly advantageous results even in tests with such test specimens. For example, the front structure of the invention provides a sensing time of less than 10 ms even upon collisions with said test specimens.

The front region of the motor vehicle has three load planes, namely a lower load plane a central load plane, and an upper load plane. The cross member may be arranged in the central load plane, but may also be at least partially arranged in the lower load plane.

The pressure tube may be spaced apart and/or offset forward in the forward direction of travel above the cross member. Such an arrangement permits particularly early sensing of an impact event in the upper load plane. The pressure tube may be arranged above the cross member in a manner spaced apart by an extent that corresponds at least to the maximum cross-sectional height of the cross member. The extent of the spacing can also correspond to twice or three times or many times the cross-sectional height of the cross member. A closer arrangement of the pressure tube to the cross member also is possible.

At least one abutment device may be arranged behind the pressure tube. In this case, the abutment device may be arranged so that the pressure tube is pressed against the abutment device in the event of a pedestrian impact. In particular, the abutment device may be arranged above the cross member. It is possible for the abutment device to be arranged at least in sections in front of the cross member. In particular, the cross member does not serve as an abutment for the pressure tube.

The abutment device may comprise at least one right abutment unit, at least one left abutment unit, and at least one central abutment unit arranged between the left and right abutment units. However, the abutment device may comprise only one or two abutment units. The abutment device can also comprise four, five or more abutment units. In particular, the left abutment unit may arranged on a left side of the vehicle front and the right abutment unit may be arranged on a right side of the vehicle front. The abutment unit arranged in-between can also be arranged eccentrically.

The abutment units may comprise installation devices for fastening components of the front region and/or of the safety system to the abutment unit. A particularly space-saving integration of the abutment device in the vehicle is thus possible.

At least one outer cladding of the front region and/or at least one illuminating device may be accommodated on at least one abutment unit. At least one headlight and in particular a main headlight of the illuminating device may be mounted in each case on the left and/or right abutment unit. It is possible for a headlight cleaning system to be accommodated on the right and/or left abutment unit. The central abutment unit can also be designed in a corresponding manner.

At least one abutment unit may have at least one guide device for the targeted spacing of the pressure tube in relation to an abutment surface. The right and/or left abutment unit may have at least one guide device. The guide device may be designed also for the installation and/or guiding of the pressure tube. For example, the pressure tube may be accommodated at least in sections in a form-fitting manner in the guide device. The abutment surface may be that surface of the abutment unit against which the pressure tube is pressed in the event of an impact. The guide device can also be designed for the targeted spacing of a damping body in relation to the abutment surface.

At least one sensor device for detecting pressure in the pressure tube may be arranged on at least one abutment unit. In particular, the central abutment unit may be designed as a sensor support. This permits particularly rapid sensing of impact events over the entire vehicle front.

At least one air-guiding opening may be arranged on at least one abutment unit, for example on the central abutment unit.

At least one of the abutment units may be suitable and designed to yield in the event of a pedestrian impact, and therefore energy is absorbable by the abutment unit. The abutment unit can thus also provide a crumple zone. In particular, the abutment unit may be designed to be deformable by means of a pedestrian impact. The central abutment unit preferably is designed in such a manner. However, it is also possible for the left and/or right abutment unit to be designed in such a manner.

The abutment unit may be a ribbed body with longitudinal ribs and/or transverse ribs or may comprise at least one such ribbed body. Such a ribbed body provides a reliable abutment for the pressure tube and at the same time may provide an advantageous crumple zone in the event of an impact.

An illuminating device and in particular a headlight and/or main headlight may be accommodated in a flexible manner on at least one abutment unit and preferably on the left and/or right abutment unit. The risk of injury to the pedestrian can be reduced further by the yielding of the illuminating device.

The pressure tube may be arranged at least in sections in at least one damping body. This enables a highly reliable maintaining of the sensing threshold and prevents erroneous triggering. The damping body may be a foam body or may comprise at least one such foam body.

The damping body may be arranged in the direction of travel at least in sections in front of the pressure tube. In particular, the pressure tube may be embedded at least in sections in the damping body. Two or more damping bodies can also be provided. In particular, the pressure tube may be arranged at least in sections between a damping body and an abutment unit.

The damping body can have a guide device for guiding and/or the targeted spacing of the pressure tube in relation to an abutment surface. For example, the damping body may have a recess and/or a groove on its rear side in which the pressure tube runs. It is possible for the guide device to prevent release of the pressure tube from the damping body. For example, holding lugs can be provided to prevent the pressure tube from emerging out of its recess.

The damping body may be arranged at least in sections directly behind an outer cladding of the front region. In particular, no further components are arranged between the damping body and the outer cladding. A spaced arrangement or else a contacting arrangement of the damping body in relation to the outer cladding can be provided. The outer cladding is, for example, a bumper cladding and/or a front end cladding and/or a front end module. This permits particularly short sensing times for detecting the impact event.

The pressure tube may extend over the front region at least to the extent so that the pedestrian impact is detectable along the entire width of the front region. Sensing over the entire width of the front region is particularly readily possible with the vehicle front structure of the invention since the pressure tube is arranged above and therefore independently of the cross member. Complicated constructions for supporting the pressure tube on the sides of the vehicle or next to the cross member are not needed. In addition, no substantial Z gaps are necessary in the profile of the pressure tube.

The pressure tube may run from one longitudinal side of the vehicle to another longitudinal side of the vehicle, and therefore substantially the entire width of the front region may be covered by the pressure tube. It is possible for the pressure tube to extend beyond the width of the front region into the side regions of the motor vehicle. However, it is also possible for the pressure tube to extend only over part of the width, for example over 95% or less or more of the width of the front region. It is then nevertheless possible for the pedestrian impact to be detectable along the entire wide side of the front region because of transmission of the impact through the outer cladding.

The cross member may connect two longitudinal members extending at least partially in a longitudinal direction of the motor vehicle. The cross member may be part of a vehicle body. At least one bumper device may be fastened to the cross member. In particular, the cross member may be a component may contribute to the overall rigidity of the vehicle body.

The terms top and bottom and front and rear and also left and right refer within the context of the present invention to a motor vehicle set up for operation and to the forward direction of travel of the motor vehicle.

Further advantages and features of the present invention emerge from the exemplary embodiment which is explained below with reference to the attached figures.

DETAILED DESCRIPTION

Figure 1:
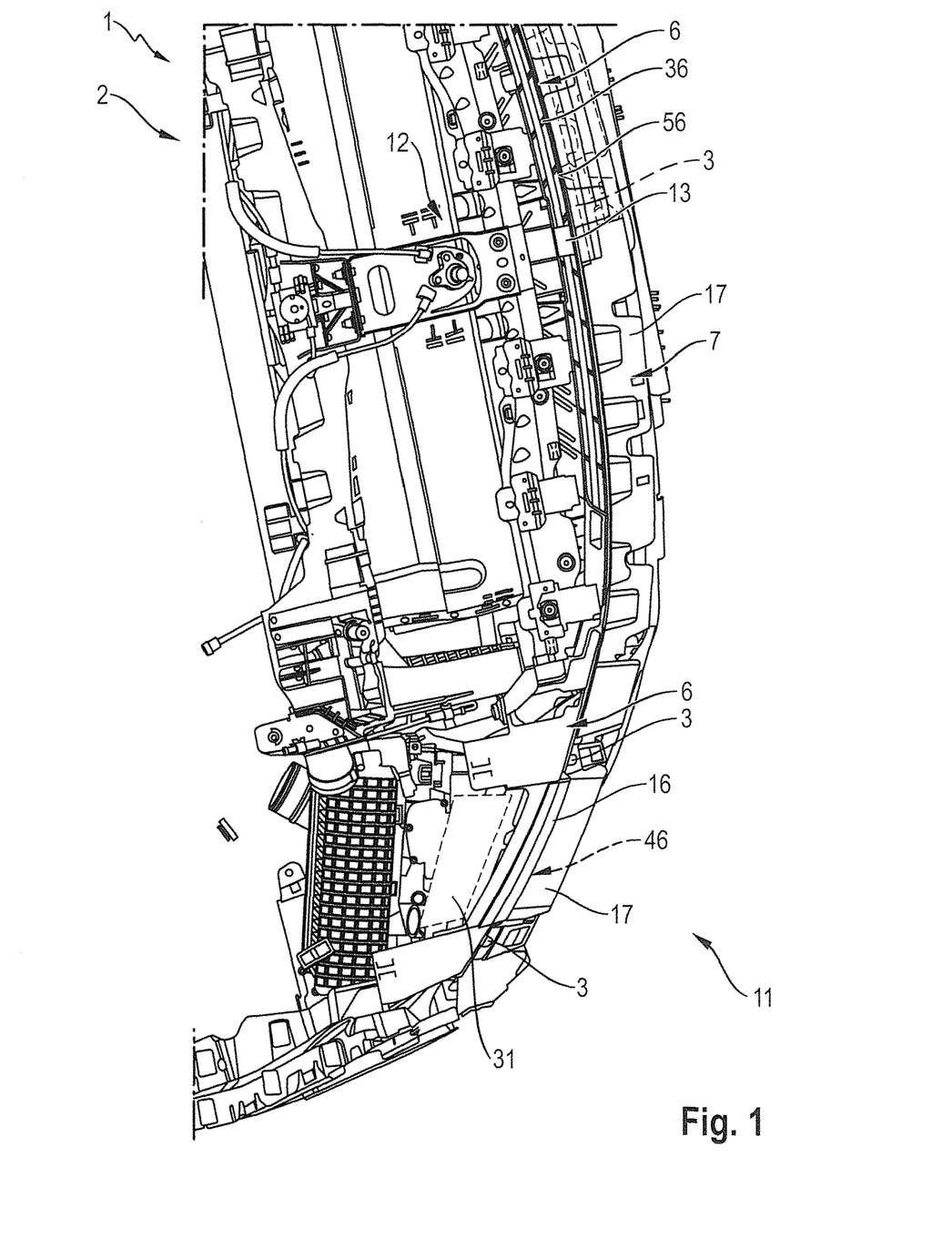
FIG. 1 is a perspective view from above of vehicle front structure according to the invention.

FIG. 1 shows a vehicle front structure 1 according to the invention with a safety system 2 for detecting a pedestrian impact in a front region 11.

The safety system 2 comprises an elastically deformable pressure tube 3 and a sensor device 13 that is connected thereto for detecting a change in pressure in the cavity of the pressure tube 3. The pressure tube 3 extends along the front region 11 to such an extent that a pedestrian impact anywhere over the entire width of the vehicle front structure 1 can be sensed reliably.

The pressure tube 3 is arranged in front of an abutment device 6. The abutment device 6 is of three-part design and comprises a right abutment unit 16 and a left abutment unit 26 (not visible here), and also a central abutment unit 36 arranged in-between. The left abutment unit 26 corresponds substantially to a left-side configuration of the right abutment unit 16.

The abutment units 16, 26, 36 each provide an abutment surface 56 against which the pressure tube 3 is pressed in the event of a pedestrian impact. The right and left abutment units 16, 26 are provided with a guide device 46 (not visible here). The guide device 46 permits targeted spacing of the pressure tube 3 in relation to the respective abutment surface 56 and serves also for the installation and/or guiding of the pressure tube 3.

An illuminating device 31 and, for example, a main headlight is in each case mounted on the left and right abutment unit 16, 26. The illuminating device 31 is fastened flexibly to the respective abutment unit 16, 26. Impact energy can thus be dissipated by yielding, for example, of a main headlight.

The pressure tube 3 is embedded in a damping body 7 designed as a foam body 17. In the right part of the figure, the damping body 7 is recessed partially or illustrated transparently so that the pressure tube 3 is better visible.

In particular, a foam body 17 is provided with an absorption foam with a foam density of, for example, 30 g/liter. A higher or lower density is also possible. The integration of the pressure tube 3 in such a foam body 17 affords the advantage that erroneous triggering, for example by small animals, branches and low obstacles up to a height of, for example, at least 800 mm, is avoided reliably.

The safety system 2 has at least one actuator 12 by means of which a front hood (not illustrated here) can be raised as a reaction to a pedestrian impact. Further actuators 12 also can be provided, and therefore the hood can be raised, for example, both in a front and in a rear region.

The safety system 2 therefore provides an activation system for actively raising the hood. For example, the actuators 12 can actuate a lock and a hinge with pyrotechnic assistance in the event of a pedestrian impact. The front hood can thus be raised promptly at the front and rear, and the risk of injury to the pedestrian can be reduced considerably.

Figure 2:
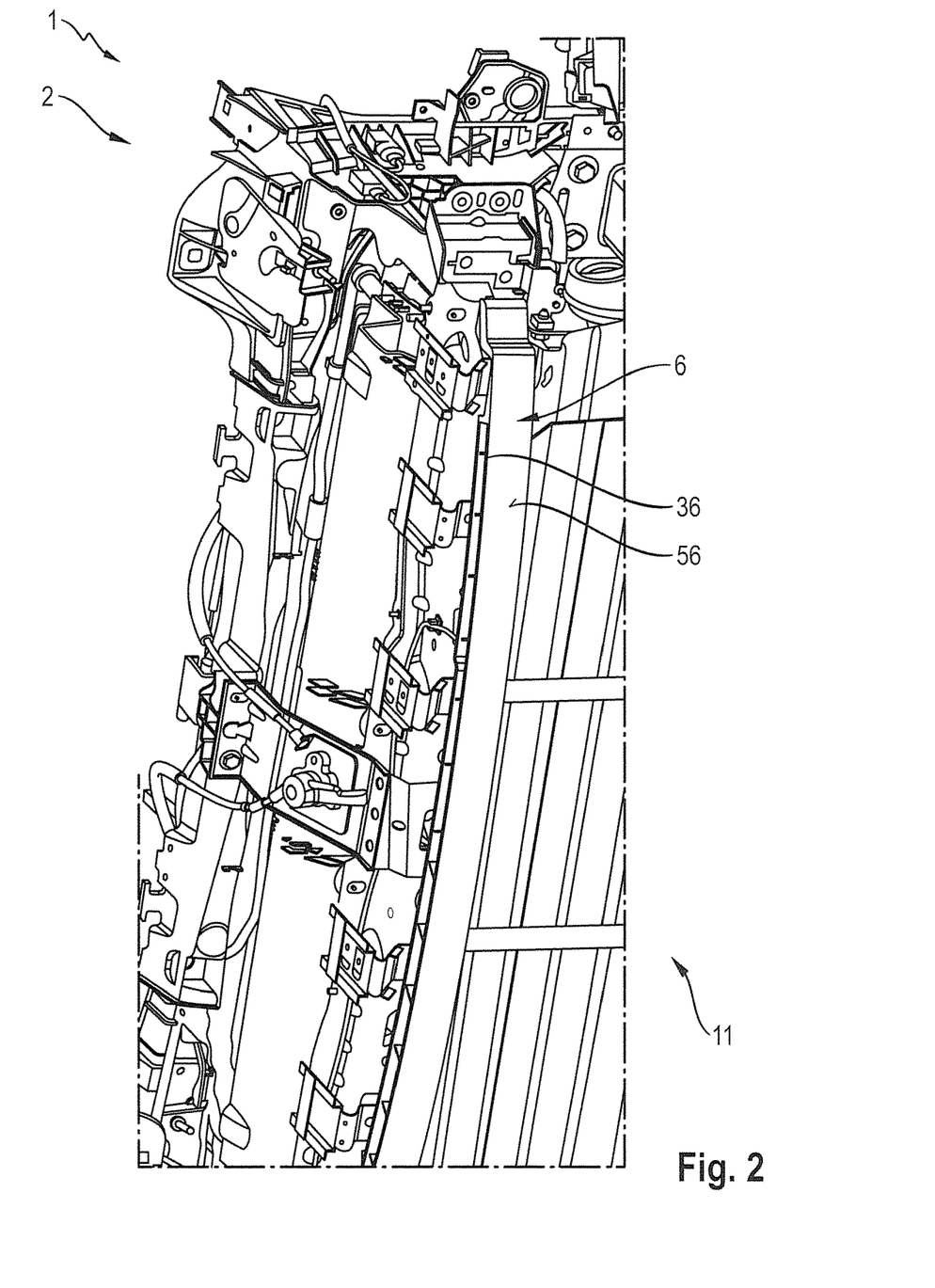
FIG. 2 is a front perspective view of the vehicle front structure.

FIG. 2 shows a detail of the vehicle front structure 1 without the damping body 7, and therefore the central abutment unit 36 and the abutment surface 56 thereof are readily visible. For the purpose of better clarity, the left abutment unit 26 has not been drawn. It can readily be seen that the central abutment unit 36 is configured with longitudinal and transverse ribs. As a result, the abutment unit 36 is deformable in a targeted manner in the event of a pedestrian impact, and therefore the energy can be absorbed. It is also of advantage for the abutment unit 36 to be arranged in the upper load plane 5 since the risk of injury in the event of an impact of a leg is thus reduced.

Figure 3:
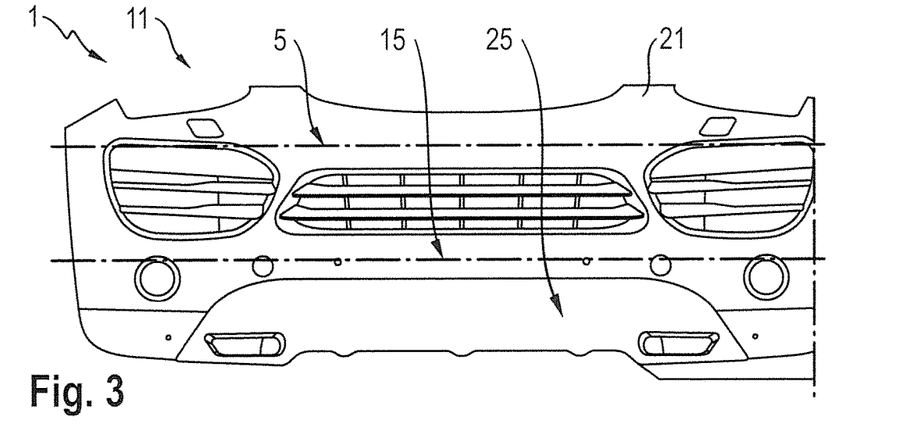
FIG. 3 is a front view of a front region of a motor vehicle.

FIG. 3 shows the vehicle front structure 1 in a front view, and therefore an outer cladding 21 of the front region 11 is readily visible. The outer cladding 21 comprises, for example, a front end cladding and/or a bumper cladding. A bumper cross member 14 (not visible here) is arranged behind the outer cladding 21.

The load planes 5, 15, 25 of the front region 11 are indicated here in highly schematic form by means of chain-dotted lines. The bumper cross member 14 is arranged in the central load plane 15.

Figure 4:
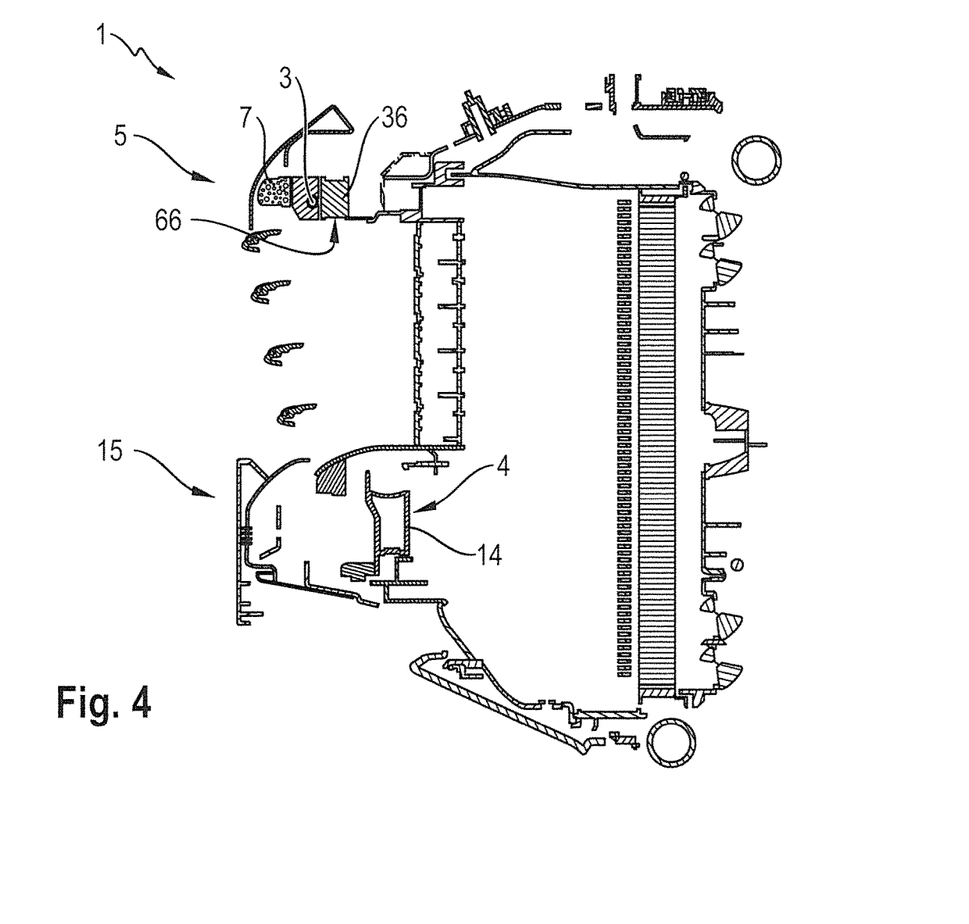
FIG. 4 is a side sectional view of the vehicle front structure
Figure 5:
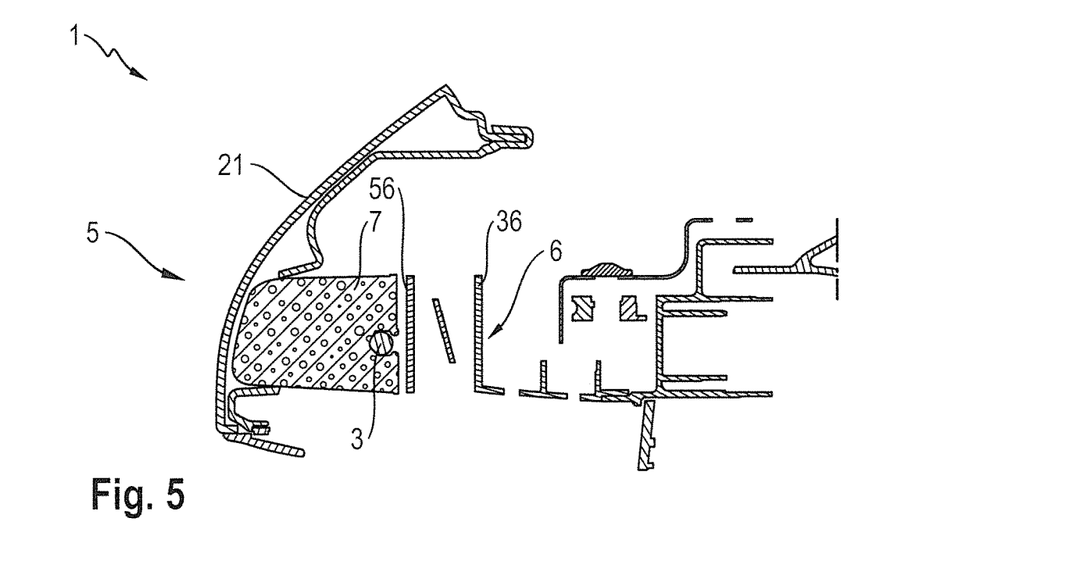
FIG. 5 is another side sectional view of the vehicle front structure.
Figure 6:
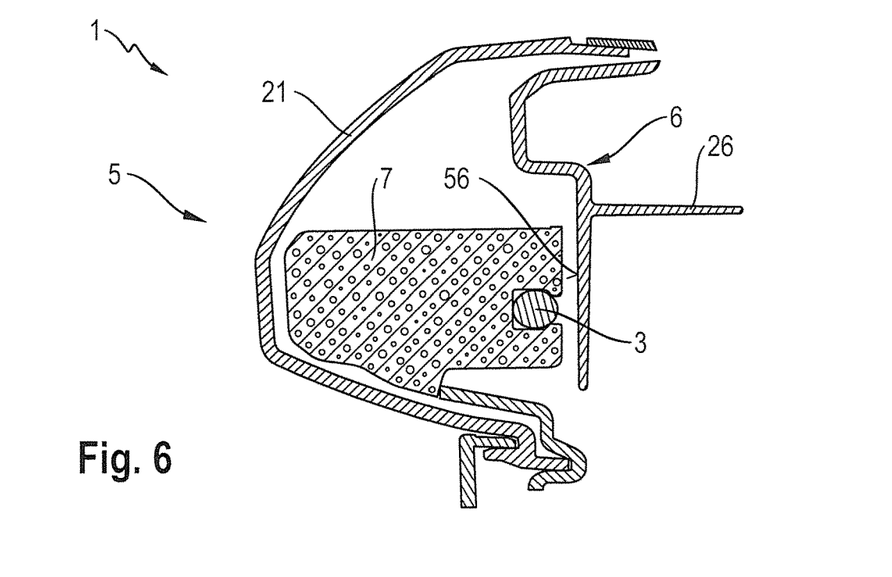
FIG. 6 is a further side sectional view of the vehicle front structure.

FIGS. 4-6 show longitudinal sections at different positions along the transverse axis of the vehicle.

FIG. 4 shows a longitudinal section through the vehicle front structure 1 in the region of the central abutment unit 36. The arrangement of the pressure tube 3 above a cross member 4 is readily visible. The cross member 4 is a bumper cross member 14. The cross member 4 serves for fastening the front bumper and defines the central load plane 15. The pressure tube is arranged above the cross member 4 in the upper load plane 5.

The pressure tube 3 is spaced apart here from the cross member 4 by a multiple of the cross-sectional height of the cross member 4. In addition, the pressure tube 3 is arranged in front of the cross member 4 in the direction of travel. The abutment unit 36 and the damping body 7 also are in front of the cross member 4 in the direction of travel. The abutment unit 36 also has an air-guiding opening 66. The embedding of the pressure tube 3 in the damping body 7 is readily visible.

FIG. 5 shows a detail of another longitudinal section in the region of the central abutment unit 36. The arrangement of the damping body 7 directly behind an outer cladding 21 can be seen readily in this detail.

The integration of the abutment device/damping body 6/7 system and also the corresponding accommodating of the pressure tube 3 in the upper load plane 5 of a front region is located as an entire system directly behind the outer cladding 21. This contributes considerably to shorter sensing times in the upper load plane 5.

FIG. 6 shows a detail of a longitudinal section in the region of the left abutment unit 26. The damping body 7 is arranged directly behind the outer cladding 21 in the upper load plane 5. The outer cladding 21 is mounted on the abutment unit 26. For this purpose, both the left and the right abutment units 26, 16 have corresponding installation devices.

Figure 7:
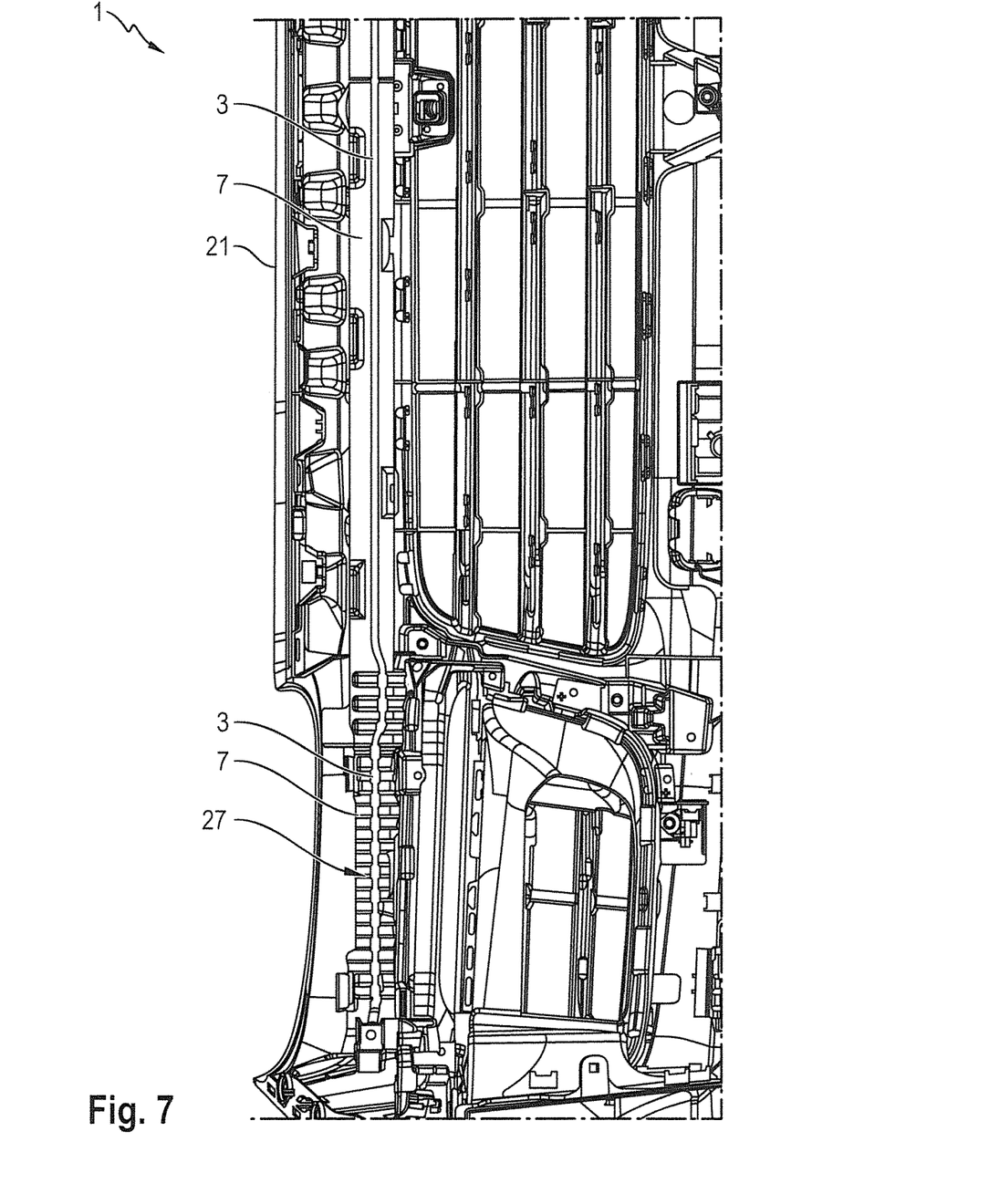
FIG. 7 is an illustration of the rear side of the vehicle front structure.

FIG. 7 shows a detail of the vehicle front structure 1 in a rear view. The profile of the pressure tube 3 along the upper load plane 5 is readily visible. The damping body 7 has a guide device 27. The pressure tube 3 is embedded in the guide device 27 and is secured in a form-fitting manner by a row of holding lugs.

The invention affords the advantage that the pressure tube 3 is positioned above the cross member 4 and therefore in the upper load plane 5 of a motor vehicle. The upper load plane 5 corresponds to a region that occurs as an upper support of a pedestrian in the event of a pedestrian impact in the front region 11. The upper load plane 5 is used here for activating the safety system and, for example, for raising a front hood.

In the case of children and, for example, preschool children, the first contact in the event of a collision generally occurs in the upper load plane 5. Use is therefore made of special test specimens to investigate the behavior of the safety system 2 in the load plane 5.

For example, the PDI-2 is used for this purpose and simulates the impact behavior not only in the region of the central load plane 15 or level with the bumper cross member 14, but also in the upper vehicle region or load plane 5.

In tests with the PDI-2, the vehicle front structure 1 of the invention can therefore provide a reduced triggering time because of the arrangement of the pressure tube in the upper load plane 5. For example, the sensing time or triggering time for the upper load plane 5 is less than 10 ms. As a result, the invention is particularly readily suitable for considerably reducing the risk of injury in the event of a collision with children. These advantages can also be achieved in tests with comparable test specimens, for example FlexPLI, TRL leg test specimens.

These triggering times are considerably shorter than, for example, in the case of systems that lie on the cross member plane 15 and generally have signals or pressure changes at the sensors substantially later. The invention therefore makes it possible to ensure an already activated system 2 upon contact with a child's head. As a result, an increased deformation space is ensured, for example, prior to contact with the head of a 6 year old child. A corresponding deformation space also is ensured in the case of taller pedestrians.

A further advantage is that the system 2 is robust against small animals and, for example, birds since these small animals either do not reach the upper load plane 5 or the sensing threshold is designed to be higher. This is achieved, for example, by embedding the pressure tube 3 in the foam bodies 17. The requirements in respect of erroneous triggering when pushing the motor vehicle are therefore also ensured. In addition, the system is robust against knocks and accidents below 20 km/h.

The invention advantageously provides an independent arrangement of the pressure tube 3 in relation to the cross member 4. No further measures for extending the range of detection outward or toward the sides of the vehicle are therefore required to achieve sensing over the entire width of the vehicle.

The arrangement of the pressure tube 3 in the upper load plane 5 affords the advantage of a lower outlay on construction since the pressure tube 3 can be arranged over the entire width of the vehicle without substantial Z gaps. Z gaps often have to be taken into consideration because of the specification of the bending radii of the pressure tube 3. Z gaps generally have the disadvantage that they have a greatly negative effect on the triggering behavior.

LIST OF REFERENCE SIGNS

1 Vehicle front structure
2 Safety system
3 Pressure tube
4 Cross member
5 Load plane
6 Abutment device
7 Damping body
11 Front region
12 Actuator
13 Sensing device
14 Bumper cross member
15 Load plane
16 Abutment unit
17 Foam body
21 Outer cladding
25 Load plane
26 Abutment unit
27 Guide device
31 Illuminating device
36 Abutment unit
46 Guide device
56 Abutment surface
66 Air-guiding opening

What is claimed is:

1. A vehicle front structure for a motor vehicle, comprising:
    a safety system with at least one pressure tube for detecting a pedestrian impact on a front region of the motor vehicle;
    an abutment device against which the pressure tube is pressed in the event of a pedestrian impact is arranged behind the pressure tube, the abutment device comprising at least one right abutment unit and at least one left abutment unit spaced from each other in a direction transverse to a longitudinal direction of the motor vehicle, and at least one central abutment unit arranged therebetween, and at least one of an outer cladding of the front region and an illuminating device is accommodated on at least one of the right and left abutment units; and
    at least one cross member extending in the transverse direction, the pressure tube being arranged above the cross member, and therefore the pedestrian impact is detectable in a load plane above a load plane defined by the cross member.

2. The vehicle front structure of claim 1, wherein the pressure tube is arranged spaced apart and offset forward above the cross member.

3. The vehicle front structure of claim 2, wherein at least one abutment unit has at least one guide device for a targeted spacing of the pressure tube in relation to an abutment surface.

4. The vehicle front structure of claim 2, further comprising at least one sensor device for detecting pressure in the pressure tube and/or at least one air-guiding opening arranged on at least one of the abutment units.

5. The vehicle front structure of claim 2, wherein at least one of the abutment units is designed to yield in the event of a pedestrian impact so that energy is absorbable by the abutment unit.

6. The vehicle front structure of claim 1, wherein at least one damping body is arranged at least in sections in front of the pressure tube.

7. The vehicle front structure of claim 6, wherein the damping body is arranged at least in sections directly behind the outer cladding of the front region.

8. The vehicle front structure of claim 1, wherein the pressure tube extends over the front region at least to the extent that the pedestrian impact is detectable along the entire width of the front region.

\* \* \* \* \*